Patented Aug. 8, 1939

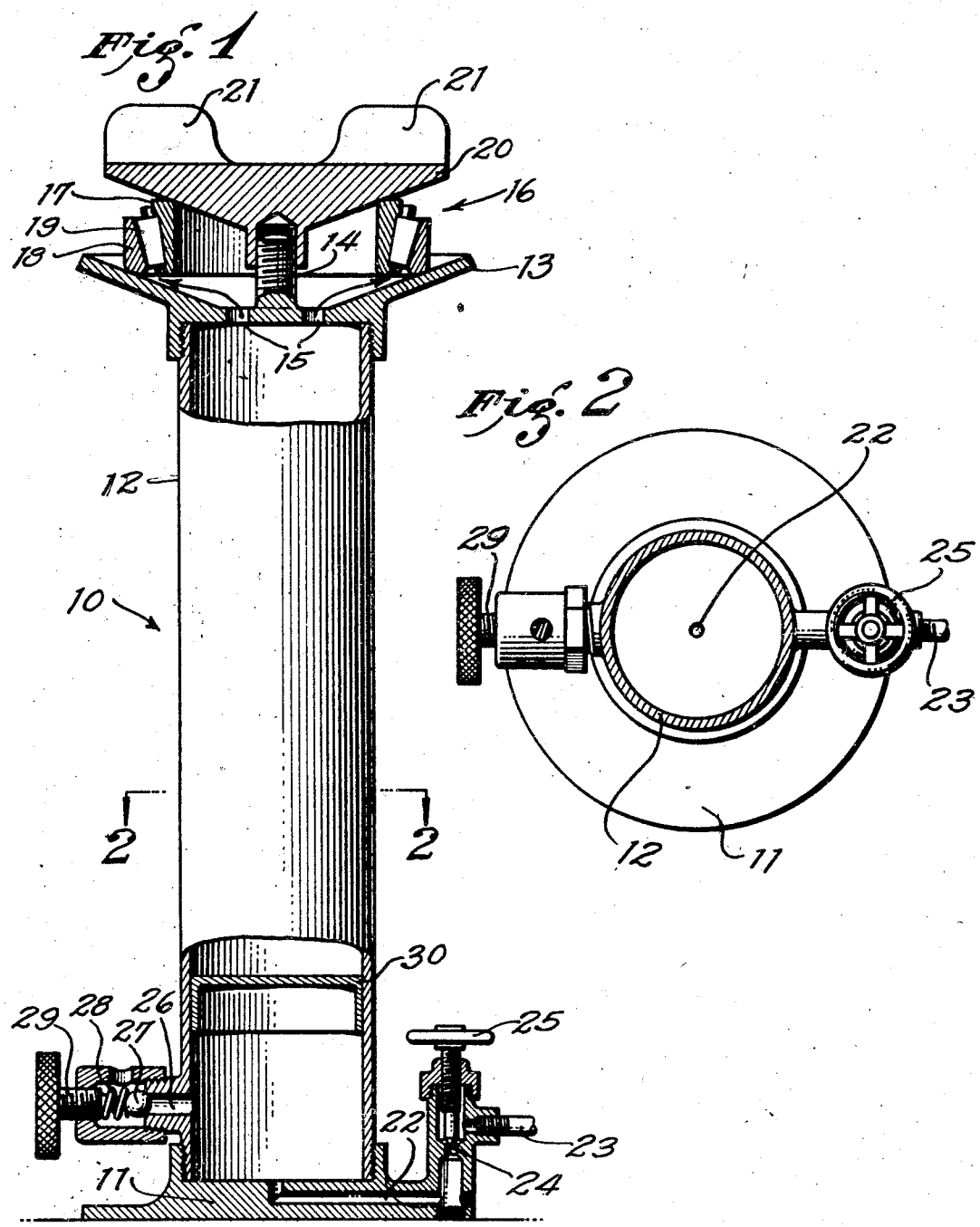

2,168,746

UNITED STATES PATENT OFFICE 2,168,746

METHOD AND APPARATUS FOR LUBRICATION

George Francis Saal and John Gustav Schmitt, Los Angeles, Calif., assignors to Economy Engineering Co. Inc., Los Angeles, Calif., a corporation of California Application June 16, 1936, Serial No. 85,474

13 Claims. (Cl. 184—1)

This invention relates to improvements for applying lubrication and has for a particular object the complete cleansing and concomitant lubrication of bearings.

As is well known, precision bearings such as ball bearings, roller bearings, and the like include a cage for holding the balls or rollers which take the load or thrust and for roller bearings may include an inner and an outer race between which the rollers are held.

Solely for the purpose of illustration, the application of the invention for the lubrication of the roller bearings used on the front wheels of automobiles will be hereafter described but it will be understood that the invention is not limited thereto but may be applied to any bearing having a general desired construction of which there are many known forms. Such general construction will be fulfilled if the bearing as a whole may be placed in the apparatus to be cleansed and lubricated.

As illustrating the mode of operation and apparatus, reference is made to the drawing in which Fig. 1 is an elevation, partly in section, of a suitable apparatus, and Fig. 2 is a top view along the lines 2—2 of Fig. 1.

The apparatus as a whole is indicated at 10 and includes a base 11 to which is fixed a barrel 12 of suitable capacity.

The upper part of barrel 12 is closed by a detachable head 13, preferably of circular shape, having a central threaded stem 14 and being drilled out around the base of said stem 14 to provide a plurality of grease holes 15 alternately spaced with metal to assume rigidity in head 13.

Head 13 is preferably conically shaped on its upper side and adapted to form a line contact with an edge of a bearing generally indicated as 16, such bearings for the purpose of illustration comprising an inner race 17 and an outer race 18 between which are held a plurality of rollers 19 in a well known manner.

In addition to rollers 19 there is space between said rollers and also clearance between said rollers and said races to assure the passage of grease from the interior of said bearing to the exterior thereof between and over the surfaces of said rollers and races in a film of greater or less thickness.

Bearing 16 is firmly held in place in the cupped side of head 13 by a conically shaped circular clamp 20 having hand grips 21 threaded onto stem 14 and adapted to hold a line contact with an edge of bearing 16.

This construction permits use of a large range of bearings of different sizes on the same apparatus.

A passage 22 extends through base 11 to be connected with a supply pipe 23 adapted to supply fluid under pressure through an orifice 24 to the interior of barrel 12 and the size of orifice 24 may be adjustably controlled by valve 25.

A pressure regulating orifice 26 is adjustably controlled by valve 27, spring 28, and stem 29.

Heretofore, in the lubrication of the bearings on the front wheels of automobiles in order to do a thorough job, after the bearing has been removed it has been necessary to thoroughly scrub the bearing with a solvent for the grease, such as gasoline or kerosene, in order to remove the grease with its contained dirt from around the rollers.

If a thorough job is done and all the grease and dirt is removed, the bearing should be completely free of grease. Then, in order to pack the bearing with clean grease, the same must be worked around the rollers by hand with the hope that all surfaces may be covered.

When it is considered that such grease is a solid, viscous material it may be readily appreciated that it is practically impossible to force such fresh grease manually onto all the roller and race surfaces so as to assure no metal-to-metal contact when the bearing is replaced on the automobile.

Hence, it is the custom after cleaning the bearing with a solvent for the purpose of removing old grease and dirt to immerse the bearing in a relatively light lubricating oil in order to assure at least a thin lubricating film on the rollers and to aid in the distribution of the hand-packed new grease.

The net results of the above described ordinary operations have been great inefficiency in lubrication, particularly with a careless operator often resulting in scored bearings and coupled with a great waste of time because it takes a careful and skilled operator from one hour upwards to do the best manual job on the two front wheel bearings of an automobile.

The present invention is designed to eliminate chance in lubricating bearings so as to provide a perfect job and at the same time to reduce the time of doing so to about fifteen minutes.

This is accomplished by removing head 13 and filling barrel 12 with the preferred lubricating grease whereby a piston 30 will be forced down the barrel 12 a predetermined distance. It is clear that piston 30 and the valve arrangements shown may be adjusted as to relative positions to permit piston 30 to rest on base 11 or to be stopped at any particular point for the free admission of fluid under pressure through passage 22, or to relieve such pressure.

Head 13 is then replaced and a bearing 16 is firmly held in place thereon by clamp 20.

Fluid under pressure is then supplied through pipe 23, orifice 24 and passage 22 to the under side of piston 30 whereby grease is forced through holes 15 and the interior of bearing 16 to pass in the direction of the arrows through the races and around and between the rollers 19.

Inasmuch as upper and lower edges of bearing 16 are held in grease-tight relation between head 13 and clamp 20, either as shown or by the addition of suitable gaskets therebetween (not shown), it is apparent that the full fluid pressure is available to force the grease in an advancing stream completely around said rollers whereby the new grease stream forces the old grease and dirt out ahead of it.

Due to such pressure, the cleansing and consequent replacing effect of the new grease is sufficient to not only scour the bearing of old grease and dirt even in minute interstices but is sufficient so that the bearing is thoroughly lubricated throughout ready for insertion in the machine for use as soon as taken from the apparatus.

Preferably the new grease is thus forced through the bearing at a relatively slow rate so that no portions will be left, or jumped, to leave air pockets or unlubricated surfaces and to this end adjustable orifice 24 is provided.

The fluid used for pressure may be the ordinary air under pressure used at service stations, or water, or other pressure means, and is conveniently supplied by pressing an air coupling onto pipe 23 and thereafter releasing the same when sufficient grease has exuded through bearing 16.

To this end, orifice 24 may be a plain orifice of particular size for a preferred air pressure for a particular grease to give the desired rate of feed for the grease, but is conveniently made adjustable for varying conditions.

Likewise, valve 27 is a pressure relief safety valve adjustable for a maximum pressure desired to give a desired rate of feed.

It should be noted that while fluid under pressure is a desirable and convenient method of supplying the grease for the aforesaid purposes, the principle of the invention is not confined to such method of applying pressure and pressure may be applied to piston 30 in many other well known ways.

Nor is the invention to be limited to the forcing of solid greases through a bearing but can be used for the cleansing and concomitant lubrication of a bearing by means of a lighter fluid lubricant, such as lubricating oil.

All such uses, however, are contemplated as coming within the scope of the appended claims.

We claim as our invention:

1. The combination with a receptacle containing lubricant of means forming a seat to hold a roller bearing in connection with said receptacle, the interior of said receptacle being in communication with the interior of said bearing, means to apply pressure to said lubricant for forcing the lubricant through said connection in an advancing stream around the rollers in said bearing, and means independent of said fluid pressure applying means for holding the bearing under constant pressure on its seat during the application of lubricant thereto.

2. The combination with a receptacle containing lubricant of adjustable means to hold a roller bearing in connection with said receptacle, the interior of said receptacle being in communication with the interior of said bearing, and adjustable means operable independently of said adjustable holding means to apply pressure to said lubricant for forcing the lubricant through said connection in an advancing stream around the rollers in said bearing, said adjustable holding means being adapted to positively hold said bearing under constant pressure on its seat during the application of lubricant thereto.

3. A lubricating device comprising a barrel for holding lubricant, a head for said barrel adapted to receive an annular roller bearing, a clamp for holding said bearing on said head, means providing a stationary support upon which said clamp is adjustably mounted for movement toward and away from said head, a passage from the interior of said barrel to the interior of said bearing, and means to apply pressure to the lubricant in said barrel.

4. A lubricating device comprising a barrel for holding lubricant, a head for said barrel adapted to receive an annular roller bearing, a clamp for holding said bearing on said head, means providing a stationary support to which said clamp is threadedly connected for adjustment with respect to said head, a passage from the interior of said barrel to the interior of said bearing, a piston in said barrel adapted to retain lubricant, and means operable independently of said clamp to apply pressure to said piston.

5. A lubricating device comprising a barrel for holding lubricant, a head for said barrel adapted to receive an annular roller bearing, a clamp for holding said bearing on said head, means providing a stationary support to which said clamp is threadedly connected for adjustment with respect to said head, a passage from the interior of said barrel to the interior of said bearing, a piston in said barrel adapted to retain lubricant, means operable independently of said clamp to apply pressure to said piston, and separate means to relieve the pressure thus applied.

6. In a device for applying pressure fluid to bearings, a barrel for holding fluid, a head for said barrel adapted to receive an annular bearing, a stationary stem, a clamp adjustably carried on said stationary stem and adapted to hold said bearing against said head, means forming communication between the interior of said barrel and the interior of said bearing, and means to apply pressure to the lubricant in said barrel.

7. In a device for applying pressure fluid to bearings, a barrel for holding fluid, a head for said barrel adapted to receive an annular roller bearing, a stem connected with said head, a clamp carried by said stem for adjustment with respect to said head for holding the bearing thereagainst, means forming communication between the interior of said barrel and the interior of said bearing, and means to apply pressure to the lubricant in said barrel.

8. In a device for applying pressure fluid to bearings, a barrel for holding fluid, a head for said barrel adapted to receive an annular bearing, a clamp threadedly connected with said head for clamping said bearing thereagainst, means forming communication between the interior of said barrel and the interior of said bearing, and means operable independently of said clamping means to apply pressure to the lubricant in said barrel.

9. An apparatus for lubricating bearing assemblies comprising, in combination, a bowl-shaped element having a circular outwardly flaring face, a screw stud secured to said element and extending axially relative to the circular flaring face thereof, an element threaded to said stud shaft for longitudinal advancement toward and away from said first-mentioned element with a face of the second-mentioned element disposed opposite said flaring face on said first-mentioned element, said faces of said elements adapted to engage peripheral edges on opposite sides of a bearing assembly and form in conjunction therewith a sealed chamber from which lubricant contained therein can not escape except by way of the clearances in the bearing assembly thus engaged, and means in one of said elements for admitting lubricant under pressure sufficient to cause the lubricant to fill said chamber and escape therefrom by way of the clearances in the bearing assembly engaged by said elements.

10. A device for lubricating bearing assemblies comprising, in combination, a base, a tubular member secured to said base and forming a reservoir for lubricant, an element secured to the upper end of said base and provided with an outwardly flaring circular flange upon which a bearing assembly may be seated with the outer peripheral edge only of the bearing assembly engaging the surface of the flange, a vertical screw shaft fixed in the bottom of said element and extending axially upwardly therefrom, a second element threadedly secured to said shaft and provided with an outwardly inclined face adapted to engage the inner peripheral edge of a bearing assembly seated upon said circular flange and form in conjunction with the surface of the circular flange and the bearing assembly a sealed chamber from which lubricant packed therein cannot escape except by way of the openings in the bearing assembly, a piston vertically reciprocable in said tubular member, and means for admitting air under pressure into said cylinder below said piston to cause the latter to rise in the tubular member and exert pressure upon any lubricant contained therein, the bearing seating element secured to the top of said tubular member provided with a series of holes around the screw shaft fixed thereto through which lubricant can pass from the tubular member when pressure is exerted on the lubricant therein by said piston.

11. In an apparatus for lubricating annular bearing assemblies, a pair of members having opposite surfaces adapted to engage respectively opposite sides of a bearing assembly, a stem fixed to one of said members, its axis being adapted to be disposed within the annulus formed by the bearing assembly, the other of said members being adapted to adjustably receive said stem for permitting relative movement between said members longitudinally of the stem, one of said members being provided with a passageway for admitting lubricant under pressure to the interior of the bearing assembly.

12. In an apparatus for lubricating bearing assemblies, a pair of members having opposite surfaces adapted to engage respectively opposite sides of a bearing assembly, a stem fixed to one of said members and being coaxial therewith, the other of said members being adapted to adjustably receive said stem for permitting relative movement between said members longitudinally of the stem, one of said members being provided with a passageway for admitting lubricant under pressure to the interior of the bearing assembly.

13. In an apparatus for lubricating annular bearing assemblies, a pair of members having opposite surfaces adapted to engage respectively opposite sides of a bearing assembly, a stem fixed to one of said members, its axis being adapted to be disposed within the annulus formed by the bearing assembly, the other of said members being adjustably cooperable with said stem for permitting relative movement between said members longitudinally of the stem, one of said members being provided with a passageway for admitting lubricant under pressure to the interior of the bearing assembly.

GEORGE FRANCIS SAAL.
JOHN GUSTAV SCHMITT.